(12) United States Patent
Alton et al.

(10) Patent No.: US 9,703,336 B2
(45) Date of Patent: Jul. 11, 2017

(54) SYSTEM AND METHOD FOR THERMAL MANAGEMENT IN A MULTI-FUNCTIONAL PORTABLE COMPUTING DEVICE

(71) Applicant: QUALCOMM Incorporated, San Diego, CA (US)

(72) Inventors: Ronald F. Alton, Oceanside, CA (US); Praveen Kumar Chidambaram, Oceanside, CA (US); Jon J. Anderson, Tracy, CA (US); Christopher Lee Medrano, Longmont, CO (US); Xin Qi, San Diego, CA (US); David Cheuk Wai Ng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 733 days.

(21) Appl. No.: 13/773,081

(22) Filed: Feb. 21, 2013

(65) Prior Publication Data

US 2014/0236380 A1 Aug. 21, 2014

(51) Int. Cl.
| G06F 1/20 | (2006.01) |
| G06F 1/16 | (2006.01) |
| G05D 23/19 | (2006.01) |
| H04M 1/725 | (2006.01) |
| G06F 1/32 | (2006.01) |

(52) U.S. Cl.
CPC ......... *G06F 1/206* (2013.01); *G05D 23/1932* (2013.01); *G06F 1/1632* (2013.01); *G06F 1/203* (2013.01); *H04M 1/72527* (2013.01); *G06F 1/324* (2013.01); *G06F 1/3206* (2013.01); *G06F 1/3296* (2013.01); *Y02B 60/1217* (2013.01); *Y02B 60/1275* (2013.01)

(58) Field of Classification Search
CPC ........ G06F 1/206; G06F 1/3206; G06F 1/324; G06F 1/3296; G06F 1/20; G06F 1/203; G06F 1/1632; G05D 23/1932; H04M 1/72527; Y02B 60/1275
USPC ................................................... 700/299, 300
See application file for complete search history.

(56) References Cited

U.S. PATENT DOCUMENTS

| 5,884,049 | A | * | 3/1999 | Atkinson | ............... | G06F 1/1632 361/679.41 |
| 6,005,368 | A | * | 12/1999 | Frame | .................... | G06F 1/1632 361/679.41 |
| 6,255,622 | B1 | * | 7/2001 | May | ........................ | G06F 1/203 361/679.41 |
| 6,282,089 | B1 | * | 8/2001 | Nakanishi | ............. | G06F 1/1632 361/679.47 |

(Continued)

*Primary Examiner* — Crystal J Barnes-Bullock
(74) *Attorney, Agent, or Firm* — Smith Tempel Blaha LLC

(57) ABSTRACT

Various embodiments of methods and systems for optimizing processing performance in a multi-functional portable computing device ("PCD") are disclosed. Depending on how the PCD is being used, the temperature limit associated with the touch temperature of the PCD may be variable. As such, a preset and fixed touch temperature limit based on a "worst use case" scenario can unnecessarily limit the quality of service ("QoS") provided to a user under different use case scenarios. Accordingly, embodiments of the systems and methods define and recognize different device definitions for the PCD which are each associated with certain use cases and each dictate different temperature thresholds or limits subject to which the PCD may run.

36 Claims, 9 Drawing Sheets

(56) References Cited

U.S. PATENT DOCUMENTS

| | | | |
|---|---|---|---|
| 8,165,727 B2 | 4/2012 | Tsutsui | |
| 8,190,276 B2 | 5/2012 | Lewis et al. | |
| 8,321,699 B1 * | 11/2012 | Dalal | G06F 1/20 713/300 |
| 8,392,340 B2 * | 3/2013 | Cox | G06F 1/1677 706/12 |
| 8,395,898 B1 * | 3/2013 | Chamseddine | G06F 1/203 361/694 |
| 8,768,530 B2 * | 7/2014 | Liang | G05D 23/1932 318/471 |
| 8,804,338 B2 * | 8/2014 | Nagasawa | G06F 1/203 165/185 |
| 9,116,677 B2 * | 8/2015 | Jain | G06F 1/1632 |
| 9,274,805 B2 * | 3/2016 | Anderson | G06F 9/4401 |
| 9,304,520 B2 * | 4/2016 | Cheng | G05D 23/1919 |
| 9,606,586 B2 * | 3/2017 | Rubenstein | G06F 1/20 |
| 2003/0220721 A1 * | 11/2003 | Cohen | G05D 23/1928 700/301 |
| 2005/0071117 A1 | 3/2005 | Escobar | |
| 2005/0210905 A1 * | 9/2005 | Burns | H01L 23/34 62/259.2 |
| 2005/0273208 A1 | 12/2005 | Yazawa et al. | |
| 2006/0193113 A1 | 8/2006 | Cohen et al. | |
| 2008/0036613 A1 * | 2/2008 | Gaskins | G06F 1/206 340/584 |
| 2010/0330950 A1 * | 12/2010 | Wells | H04B 1/3883 340/584 |
| 2011/0251733 A1 * | 10/2011 | Atkinson | G06F 1/206 700/300 |
| 2013/0090888 A1 * | 4/2013 | Anderson | G06F 1/203 702/130 |
| 2014/0163765 A1 * | 6/2014 | Jain | G06F 1/206 700/300 |

\* cited by examiner

EXEMPLARY DEVICE DEFINITION TABLE

| | Definition A | Definition B | Definition C |
|---|---|---|---|
| Maximum Allowable Skin Temperature | Device may be touched briefly under normal use | Device may be touched for short period (e.g., 10 sec) under normal use | Device may be touched continuously under normal use |
| | 95 °C | 85 °C | 75 °C |

FIG. 1

EXEMPLARY DEVICE DEFINITION A

- TOUCH TEMPERATURE LIMIT OF DEVICE SET AT HIGH TEMPERATURE OR IGNORED OR DISABLED
- THERMAL MANAGEMENT POLICIES MAY INCLUDE THERMAL MITIGATION TECHNIQUES DRIVEN BY TEMPERATURES ASSOCIATED WITH PoP MEMORY, JUNCTIONS AND / OR OTHER CRITICAL COMPONENTS
- MAXIMUM QoS AS DEFINED BY PERFORMANCE SUBJECT TO TOUCH TEMPERATURE BASED ON BRIEF TOUCHING BY USER UNDER NORMAL USE CONDITIONS

---

EXEMPLARY DEVICE DEFINITION B

- TOUCH TEMPERATURE LIMIT OF DEVICE SET AT MODERATELY HIGH TEMPERATURE
- THERMAL MANAGEMENT POLICIES MAY INCLUDE THERMAL MITIGATION TECHNIQUES DRIVEN BY TEMPERATURES ASSOCIATED WITH TOUCH TEMPERATURE AND/OR NEXT CRITICAL THRESHOLD
- MAXIMUM QoS AS DEFINED BY PERFORMANCE SUBJECT TO TOUCH TEMPERATURE BASED ON USER TOUCHING FOR SHORT PERIOD UNDER NORMAL USE CONDITIONS

---

EXEMPLARY DEVICE DEFINITION C

- TOUCH TEMPERATURE LIMIT OF DEVICE SET AT A RELATIVELY LOW TEMPERATURE
- THERMAL MANAGEMENT POLICIES MAY INCLUDE THERMAL MITIGATION TECHNIQUES DRIVEN PRIMARILY BY TEMPERATURES ASSOCIATED WITH TOUCH TEMPERATURE
- MAXIMUM QoS AS DEFINED BY PERFORMANCE SUBJECT TO TOUCH TEMPERATURE BASED ON USER TOUCHING CONTINUOUSLY UNDER NORMAL USE CONDITIONS

*FIG. 6*

SYSTEM AND METHOD FOR THERMAL MANAGEMENT IN A MULTI-FUNCTIONAL PORTABLE COMPUTING DEVICE

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, as are often found in larger computing devices such as laptop and desktop computers. Instead of using fans, PCDs may rely on strategic placement of passive cooling devices and/or spatial arrangement of electronic packaging so that two or more active and heat producing components are not positioned proximally to one another. When two or more heat producing components are suitably spaced from one another within a PCD, thermal energy generated from the operation of each component may not combine to cause temperatures that can negatively impact user experience.

The reality, however, is that PCDs are typically limited in size and, therefore, room for components within a PCD often comes at a premium. As such, there just typically isn't enough space within a PCD for engineers and designers to control temperature through spatial arrangements or placement of passive cooling components. Therefore, to reduce thermal energy generation within a PCD, engineers and designers often leverage one or more thermal mitigation techniques that essentially trade off PCD performance for a lower rate of thermal energy generation. Implementation of a thermal mitigation technique is usually triggered by temperature measurements within the PCD.

The trigger temperature for applying a thermal mitigation technique in a PCD is usually linked to temperature limits associated with various aspects of the device, such as the "touch temperature" of the device or the maximum operating temperature of a memory component. Notably, temperature limits associated with certain aspects of a PCD are often set based on a "worst" use case scenario and, as such, may be unnecessarily low in other use cases. Consequently, PCD performance is often sacrificed unnecessarily by applying thermal mitigation techniques when the PCD is not functioning according its most limiting use case.

Accordingly, what is needed in the art is a method and system for recognizing different use cases and defining temperature limits accordingly so that thermal energy generated by the PCD may be managed smartly without over-impacting its performance and functionality.

SUMMARY OF THE DISCLOSURE

Various embodiments of methods and systems for optimizing processing performance in a multi-functional portable computing device ("PCD") are disclosed. Notably, in many PCDs, the "touch temperature" of the external surfaces of the device limits the extent to which the performance capabilities of the PCD may be exploited. Generally, as more power is consumed by the various components of a PCD, the resulting generation of thermal energy may cause the external temperatures of the PCD to detrimentally affect user experience.

Depending on how the PCD is being used, however, the temperature limit associated with the touch temperature of the PCD may be variable. As such, a preset and fixed touch temperature limit based on a "worst use case" scenario can unnecessarily limit the quality of service ("QoS") provided to a user under different use case scenarios. For instance, a touch temperature limit (i.e., a skin temperature limit) dictated by a telecommunication use case that assumes the user to be in constant physical contact with the PCD may prevent the PCD from running at its maximum processing speed during a benchmark test. Similarly, the same touch temperature limit may detrimentally impact the QoS provided when the PCD is docked in a car kit and being used as a navigation device (i.e., a use case that assumes physical contact with the user for only a short or brief period of time).

Accordingly, embodiments of the systems and methods define and recognize different device definitions for the PCD which are each associated with certain use cases and each dictate different temperature thresholds or limits subject to which the PCD may run. Initially, a first device definition is established for the PCD and temperature thresholds associated with that first device definition are set. Notably, the temperature thresholds may set temperature limits for aspects of the PCD including, but not limited to, the outer shell temperature (i.e., "skin temperature" or "touch temperature"). The PCD then runs, providing maximum functionality subject to thermal mitigation techniques driven by the temperature thresholds.

One or more indicators in the PCD are monitored in an effort to identify that the PCD is operating or providing functionality per a use case not associated with the first device definition. Exemplary indicators include, but are not limited to, operating system ("OS") level data indicative of a benchmark test, signals from a proximity sensor that relate the relative proximity of the PCD to a user, signals indicating that the PCD is in communication with an accessory device external to the PCD (e.g., a monitor, a docking station, etc.), etc. In the event that one or more indicators indicate that the PCD use case has changed such that the temperature thresholds associated with the first device definition are not optimal, the device definition is changed to a second device definition that is associated with the active use case. Advantageously, by redefining the device definition to the second device definition, the temperature thresholds may be modified to set points considered optimal for the active use case.

In this way, the systems and methods ensure that temperature thresholds are set such that the PCD may provide maximum QoS under given use cases. That is, by modifying the temperature thresholds per device definitions associated with use cases, the systems and methods dictate that thermal mitigation techniques, such as dynamic voltage and frequency scaling ("DVFS") algorithms, do not over regulate processing performance in an effort to hold thermal energy generation at unnecessarily low levels.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 1 is an exemplary table illustrating temperature limit settings that may be associated with a portable computing device ("PCD") based on different device definitions;

FIG. 6 is a diagram illustrating exemplary conditions and thermal management policies associated with the device definitions illustrated in FIG. 5;

DETAILED DESCRIPTION

Figure 2:
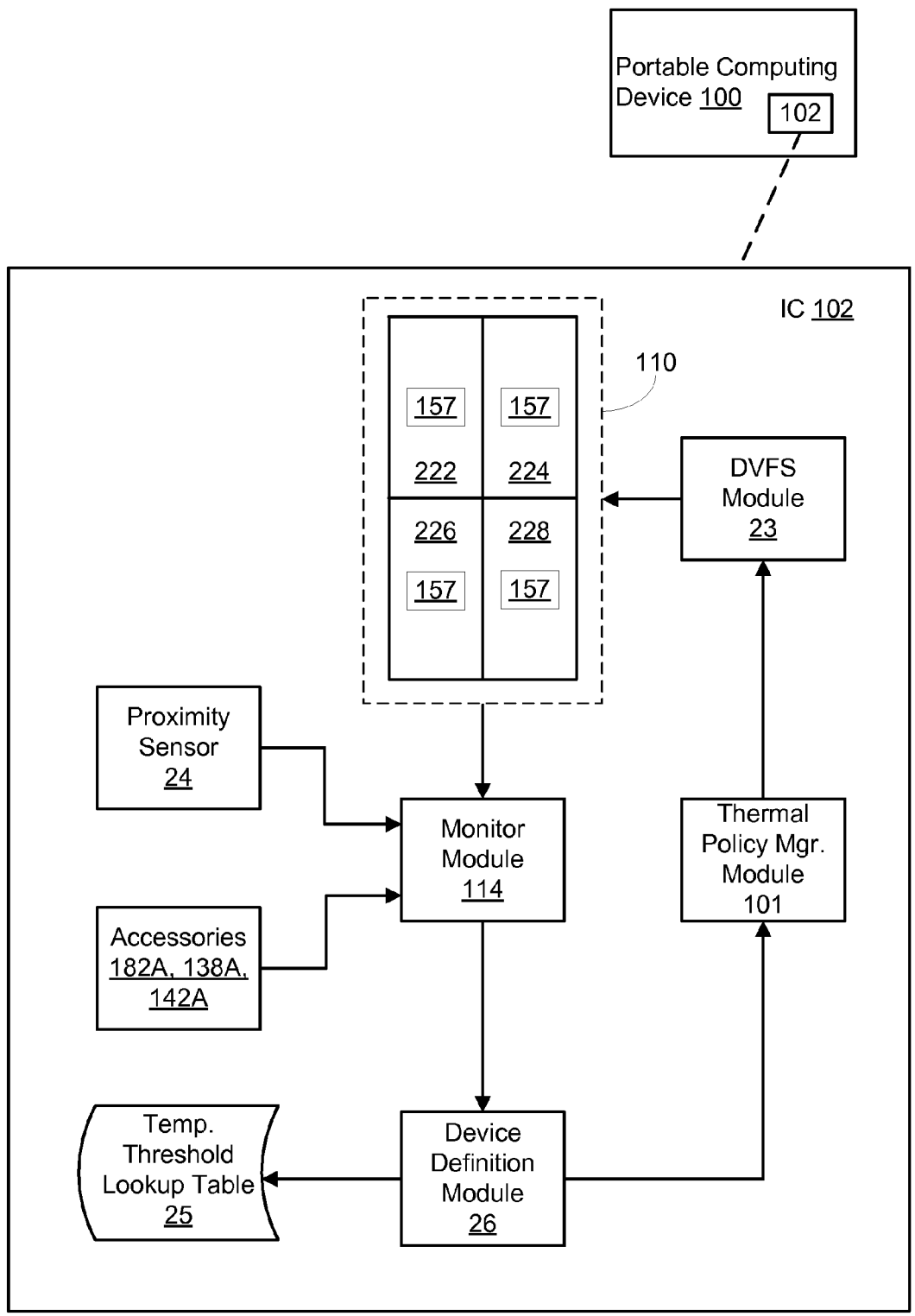
FIG. 2 is a functional block diagram illustrating an embodiment of an on-chip system for implementing device definition-driven thermal management in a portable computing device ("PCD")

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD. That is, although many of the embodiments are described in the context of a processing component, it is envisioned that thermal policies triggered by proximity measurements may be applied to any functional component within a PCD including, but not limited to, a modem, a camera, a wireless network interface controller ("WNIC"), a display, a video encoder, a peripheral device, etc.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a thermal aggressor, one of ordinary skill in the art will acknowledge that use of these "thermal" terms in the present disclosure may be related to process load distributions, workload burdens and power consumption.

In this description, the terms "thermal mitigation technique(s)," "thermal policies," "thermal management," "thermal mitigation measure(s)" and "throttling strategy" are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

In this description, the terms "skin temperature" and "outer shell temperature" and the like are used interchangeably to refer to a temperature associated with the outer shell or cover aspect of a PCD. As one of ordinary skill in the art would understand, the skin temperature of a PCD may be associated with a sensory experience of the user when the user is in physical contact with the PCD.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In portable computing devices, the tight spatial arrangement of thermally aggressive components lends to excessive amounts of heat being produced when those components are asked to process workloads at high performance levels. In many cases, the temperature threshold of the outer surface of the PCD, i.e. the "skin temperature," is the limiting factor in just how much thermal energy the components within the PCD are allowed to produce. Notably, the skin temperature threshold is often dictated by the maximum temperature to which a user may be exposed and not the maximum temperature to which the components themselves may be exposed. That is, the user experience as measured by the skin temperature of the PCD is often the factor from which a thermal mitigation algorithm determines that the processing performance of components within the PCD must be dialed back.

Commonly, the skin temperature threshold in a PCD is often preset and fixed based on a certain use case, even though the allowed skin temperature limit varies depending how the PCD is being used. For instance, a PCD being held by a user during a telecommunication or when playing a game may be limited to a maximum skin temperature of 75° C. while it may be acceptable for the same PCD to reach a skin temperature of 95° C. when it is docked in a car kit and being used as a hands-free navigation device or MP3 player. As such, one of ordinary skill in the art will recognize that fixing the skin temperature limit, or other temperature limits, in a PCD based on a certain "worst case" scenario may unnecessarily limit the processing capabilities of the PCD (and, by extension, the QoS) under different use cases. For this reason, in exemplary embodiments of the systems and methods disclosed herein the skin temperature limit of a PCD may be an adjustable input, correlated to a device definition or use case, to a thermal mitigation algorithm that uses the input to drive the application of one or more thermal mitigation techniques.

Embodiments of the systems and methods may raise, lower or ignore the preset skin temperature threshold of the PCD based on how the PCD is being used. As the skin temperature threshold is adjusted, performance constraints on the processing components within the PCD may be relaxed or tightened to optimize QoS in view of the functionality being provided. Exemplary embodiments define how the PCD is being used by monitoring any number of inputs or conditions in the PCD such as, but not limited to, temperature sensors associated with thermal energy generating subsystems, proximity sensors configured to detect the physical proximity of the PCD to a user, accessory connections or inputs, use case data generated by the operating system, etc.

Exemplary inputs useful for determining a device definition that may be recognized by certain embodiments include, but are not limited to, an active video display output, an active battery charging cycle, current levels on a power rail, an active docking connection, etc.—essentially, a device definition trigger or input may be any indication that the PCD is being used in a certain manner and not another. Once a device definition trigger, or combination of device definition triggers, is recognized, certain embodiments may define or redefine the device definition of the PCD such that a modification of temperature thresholds is acceptable.

Once a device definition change is recognized, embodiments of the systems and methods may use the new device definition to determine appropriate adjustments to temperature thresholds, such as a skin temperature threshold, that are used as inputs to a thermal mitigation algorithm. Consequently, the thermal mitigation algorithm may react to the adjusted temperature threshold(s) by either relaxing or restricting power consumption of one or more processing components. Notably, although exemplary embodiments are described herein relative to adjusting a skin temperature threshold, it is envisioned that certain embodiments may adjust other temperature related thresholds within the PCD including, but not limited to, temperature thresholds associated with various processing and/or memory components.

As one of ordinary skill in the art will recognize, an adjustment of a temperature threshold based on recognition of a device definition change (i.e., a change in how the PCD is being used), such as an adjustment of the skin temperature threshold, may cause a thermal management algorithm to leverage means for throttling a core up or down to an optimum performance level. As more specifically described below, throttling strategies are various methods, applications and/or algorithms that may be employed by the PCD to increase its performance through adjustment of hardware and/or software parameters, such as the clock speed of a central processing unit ("CPU") or the like. Certain throttling strategies may increase performance of a PCD at the expense of increased thermal energy generation; however, certain other throttling strategies may mitigate a detrimental rise in operating temperature by reducing PCD performance.

Figure 8:
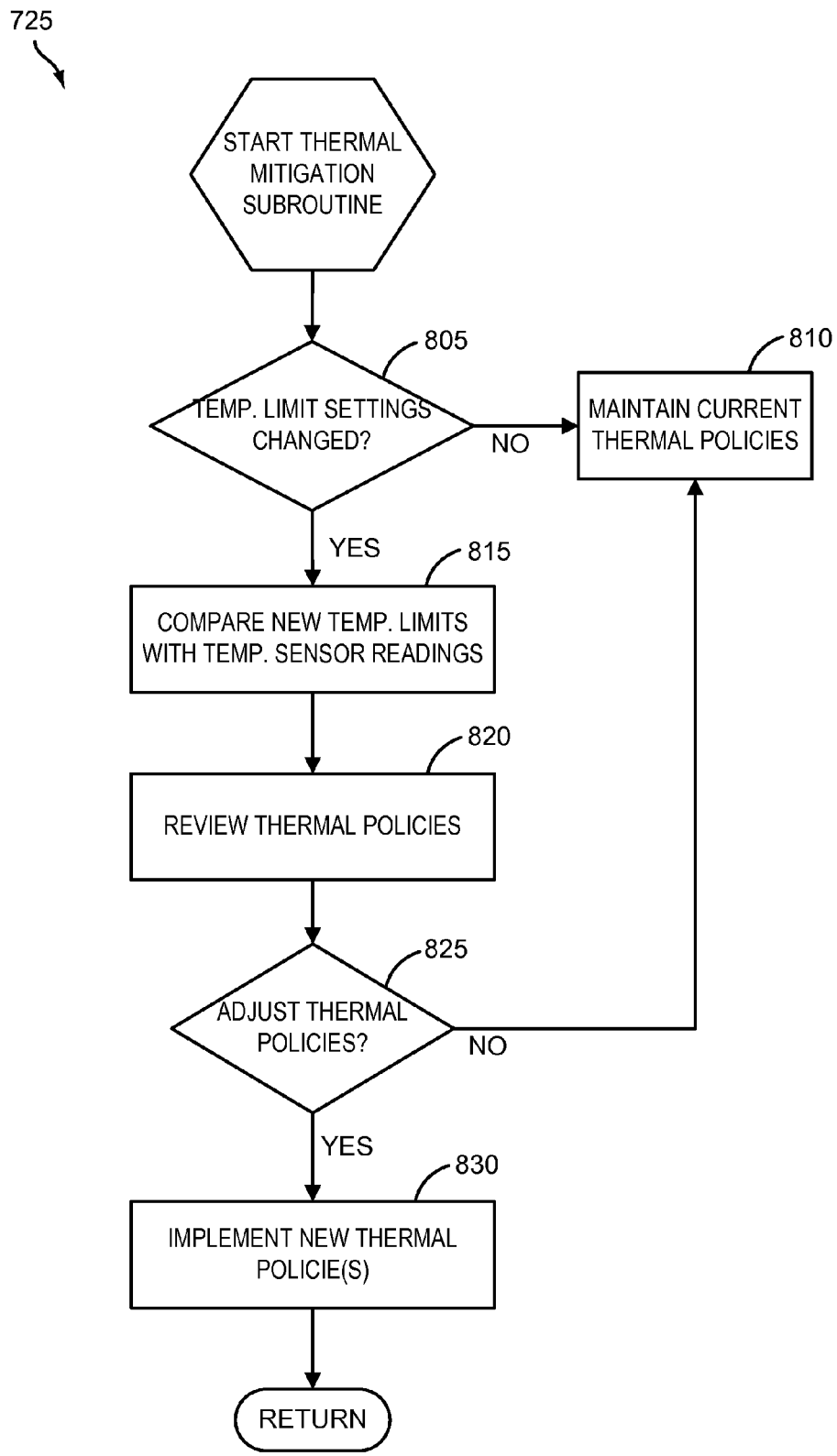
FIG. 8 is a logical flowchart illustrating a sub-method or subroutine for applying device definition-driven thermal management policies.

An exemplary throttling method that may be used by embodiments of the systems and methods is a dynamic voltage and frequency scaling ("DVFS") method, described in more detail relative to FIG. 8. Even though the various exemplary embodiments described in this specification utilize throttling methodologies, such as DVFS, to manage thermal energy generation by a thermally aggressive processing component, it is envisioned that systems and methods will not be limited to using throttling techniques in an effort to optimize performance in light of a temperature threshold that has been adjusted per a redefined device definition. That is, it is envisioned that some embodiments may additionally, or exclusively, leverage operating system level thermal mitigation techniques such as, but not limited to, workload shifting techniques.

As described above and below, managing thermal energy generation in a PCD, without unnecessarily impacting quality of service ("QoS"), can be accomplished by recognizing one or more sensor measurements or use case conditions that are indicative of how a multi-functional PCD is being used. Notably, because many PCDs include a wide range of functionality, the specific functionality being provided can drive the classification or device definition of the PCD at any given point in time. For instance, if a PCD is being held to a user's ear while engaged in a telecommunication, the device definition of that PCD at that point in time may be one of a mobile telephone. But, the device definition of the same PCD may be redefined after the telecommunication is terminated and the user lays the PCD on a table and tethers it to a 70" liquid crystal display for rendering a movie.

Notably, the specified temperature limits of a PCD that is a mobile phone may differ significantly from the specified temperature limits of a PCD that is being used to provide multi-media content to a tethered display device.

FIG. 1 is an exemplary table illustrating temperature limit settings that may be associated with a portable computing device ("PCD") based on different device definitions. Notably, as one of ordinary skill in the art will recognize, maximum allowable temperatures set by original equipment manufacturers ("OEM") and/or third party certifications may vary with the device definition. For example, the maximum allowable skin temperature of a PCD may be higher when it is being used as a docked navigation system or tethered to a monitor for rendering video media than when it is being held to the ear of a user for its telecommunication functionality.

Referring to the FIG. 1 table, the maximum allowable skin temperature varies from 95° C. down to 75° C. depending on the device definition, i.e. depending on how the PCD is being used. For instance, an exemplary multi-functional PCD, depending on how it is being used at any given time, may be defined per any one of Definitions A, B or C. Notably, although the exemplary embodiments are described in the context of a PCD that may be defined per any one of three device definitions A, B or C, embodiments of the systems and methods are not limited to three device definitions. That is, it is envisioned that embodiments may include more or less than three device definitions.

Returning to the FIG. 1 table, if the exemplary PCD is being used in a manner that dictates the user may be in contact with the PCD continuously, then the exemplary PCD may be defined per Definition C and the skin temperature limited to a maximum threshold of 75° C. Similarly, in the event that the same exemplary PCD is used in such a manner that requires a user to be in physical contact with it for a relatively short period of time, then the same exemplary PCD may be defined per Definition B and the skin temperature limit raised slightly to 85° C. Moreover, if the exemplary PCD is asked to deliver functionality that requires only brief user contact, it may be defined per Definition A and the skin temperature limit maximized at a relatively hot 95° C. Notably, as one of ordinary skill in the art will recognize, device definitions associated with higher skin temperature limits may allow for increased processing performance by thermal energy generating processing components.

Again, the FIG. 1 device definition table is offered for illustrative purposes only and will not limit the scope of the methods and systems to such an extent that only three device definitions are applicable. It is envisioned that embodiments will include two or more device definitions, each definition of which may be associated with a different combination of temperature limits or thresholds. Additionally, although the FIG. 1 device definition table includes only temperature thresholds related to skin temperature of the exemplary PCD, such is not a limiting factor on the scope of the systems and methods. That is, as described above, it is envisioned that device definitions included in certain embodiments may set temperature thresholds for any number of aspects of a given PCD such as, but not limited to, an outer shell, a processing component, a junction aspect, a Package on Package ("PoP") memory element, etc. Notably, it will therefore be understood that redefining an exemplary PCD from a first device definition to a second device definition may entail an adjustment to more than one temperature threshold, any one of which may or may not be associated with the skin temperature.

FIG. 2 is a functional block diagram illustrating an embodiment of an on-chip system 102 for implementing device definition-driven thermal management in a portable computing device 100. To adjust temperature thresholds for triggering the application of one or more thermal mitigation techniques, the on-chip system 102 may recognize any number of device definitions uniquely associated with certain functionality or use cases. To recognize a device definition, or a change in the device definition, the on-chip system 102 may leverage inputs from various accessory connections 182, 138, 142 and/or various sensors 24, 157 for detecting proximity of the PCD 100 to a user or measuring temperatures associated with processing components 110. Advantageously, by determining and updating acceptable temperature thresholds based on device definitions, the QoS experienced by a user of the PCD may be optimized by avoiding unnecessary throttling of the CPU 110 that could result from fixed, over-restrictive temperature thresholds.

In general, the system employs two main modules which, in some embodiments, may be contained in a single module: (1) a device definition ("DD") module 26 for recognizing how a PCD is being used and adjusting temperature thresholds according to device definitions associated with recognized uses; and (2) a thermal policy manager ("TPM") module 101 for implementing throttling strategies based on the temperature threshold set by the DD module 26. Advantageously, embodiments of the system and method that include the two main modules leverage inputs indicative of use cases, such as user proximity data or active accessory connections, to capitalize on opportunities for processing components 110 within the PCD 100 to consume more power, and thus generate more thermal energy, when the touch temperature, i.e. the outer temperature of the PCD 100 exposed to a user, is not a significant factor of user experience.

In some exemplary PCDs 100, the DD module 26 may recognize a condition of user proximity by virtue of receiving a signal from a monitor module 114 that is in communication with a proximity sensor 24. As is understood by one of ordinary skill in the art, a proximity sensor 24 may be able to detect the proximal presence of a user with and/or without the user physically contacting the PCD 100. Based on the proximity measurement, the DD module 26 may determine a device definition for the PCD 100 and adjust maximum temperature thresholds according to the device definition. The DD module 26 may query a temperature threshold lookup table ("LUT") 25 to identify the temperature thresholds associated with the device definition.

Some embodiments of a proximity sensor 24 may be configured to emit an electromagnetic field and recognize a disturbance in the field that indicates user proximity to the PCD 100. Similarly, other proximity sensor embodiments 24 may generate an electromagnetic transmission (e.g., infrared) and recognize a return transmission that reflects from a proximal user. Still other embodiments of a proximity sensor 24 may leverage gyroscopes or accelerometers to deduce a user's presence based on movement of the PCD 100. Notably, although it is envisioned that certain proximity sensor technologies and/or algorithms that may be used by various embodiments to determine or deduce relative proximity of a user to a PCD 100 may be novel in and of themselves, it will be understood that embodiments of the system and method that leverage proximity measurements to identify device definition(s) are not limited to any particular proximity sensor technology or methodology.

Returning to the FIG. 2 illustration, the DD module 26 may receive a signal generated by the proximity sensor 24 that indicates the PCD 100 is not proximal to a user. Notably, because the PCD 100 is not physically near a user, the touch temperature of the PCD 100 is not a significant factor of user experience in the short term. As such, even though increased thermal energy dissipation may cause the touch temperature of the PCD 100 to exceed a threshold associated with a first device definition, the DD module 26 may adjust the temperature thresholds upward and consistent with a second device definition triggered by the proximity measurement. Advantageously, under the exemplary second device definition the TPM module 101 may authorize the DVFS module 23 to allow the various processing cores 222, 224, 226, 228 of the multi-core processing component 110 to increase processing capacity, thereby providing an optimum QoS for the active use case.

Furthering the exemplary scenario of a proximity measurement that indicates the user is physically away from the PCD 100, the DD module 26 may redefine the device definition, query temperature thresholds associated with the redefined device definition and then communicate with the TPM module 101 to override or adjust the temperature threshold associated with, for example, acceptable touch temperature of the PCD 100. In adjusting the temperature threshold, the DD module 26 may set a new, higher temperature threshold associated with temperature limits of one or more components of the PCD 100. Subsequently, the TPM module 101 may receive temperature readings from the monitor module 114 indicating temperature levels sensed by sensors 157 which may be associated individually or collectively with one or more various processing components 222, 224, 226, 228 or outer shell aspect of the PCD 100. Based on the temperature readings from sensors 157 and the new, higher temperature threshold set by the DD module 26, the TPM 101 may implement thermal management techniques to optimize processing performance in view of thermal energy dissipation.

Similar to the exemplary scenario described above for determining a device definition from a proximity measurement, some embodiments may determine a device definition from an indication of an active accessory input 182, 138, 142. The monitor module 114, in addition to or in lieu of monitoring a proximity sensor 24 and temperature sensors 157, may recognize and communicate to the DD module 26 when the PCD 100 is in communication with an accessory such as, but not limited to, a docking station via docking port 182, an external keyboard or some other accessory via USB port 142, or an external display via video port 138, etc. Notably, by recognizing such active functionality in the PCD 100, the DD module 26 may determine that the PCD 100 is being used according to a certain use case (e.g., as a hands free navigation system) and redefine the device definition of the PCD 100 accordingly.

Yet another exemplary scenario for determining a device definition envisions embodiments that monitor for and recognize an indication that the PCD 100 is being run subject to a benchmark test. The monitor module 114, in addition to or in lieu of monitoring a proximity sensor 24 and temperature sensors 157, may recognize and communicate to the DD module 26 when the PCD 100 is being benchmarked. Notably, by recognizing such a use case, the DD module 26 may redefine the device definition such that skin temperature thresholds and/or other temperature thresholds are significantly raised, disabled or ignored. In this way, the DD module 26 may ensure that the performance of the PCD is maximized for the purpose of the benchmark test and not inhibited by thermal mitigation efforts.

Figure 3:
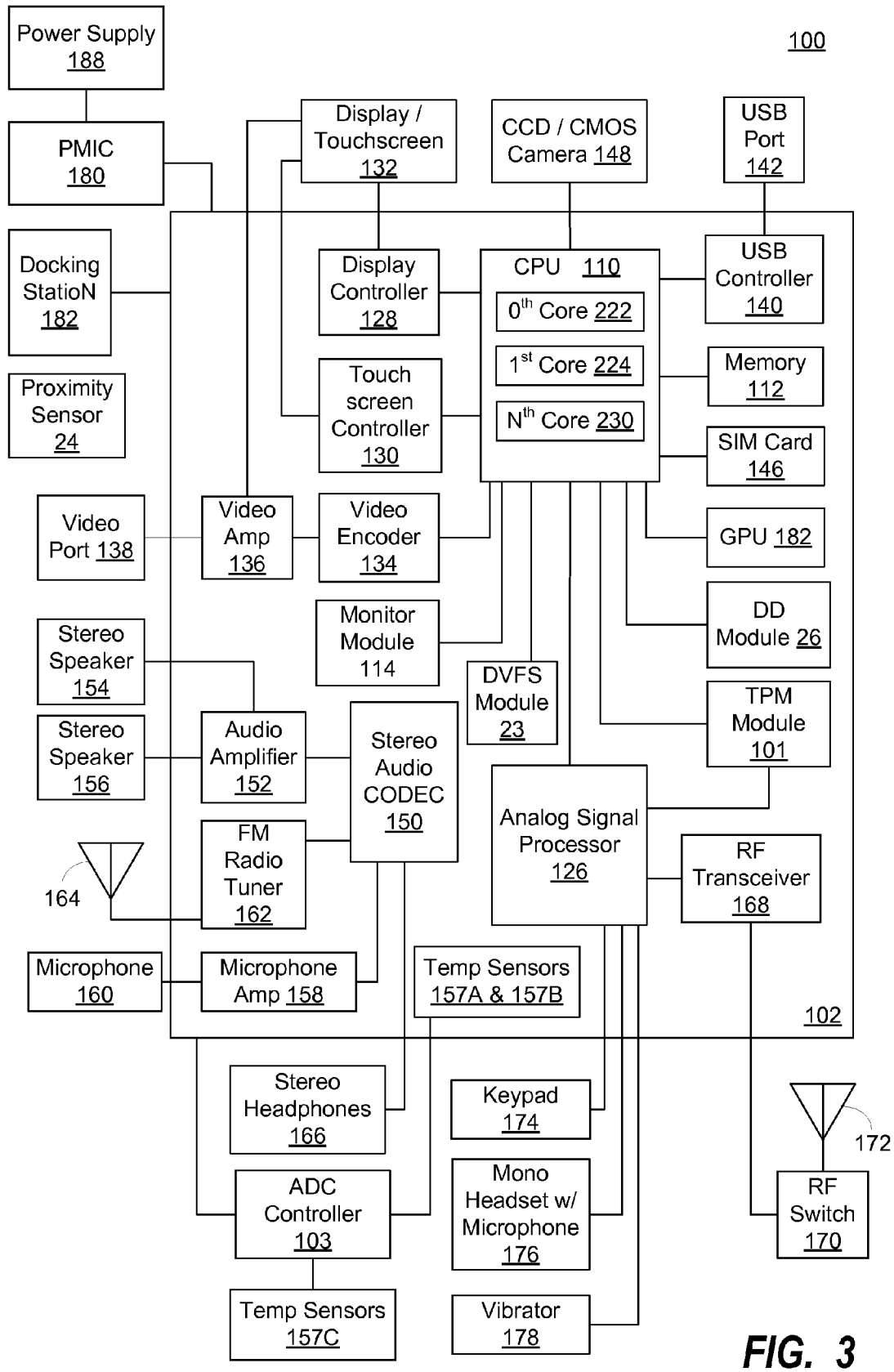
FIG. 3 is a functional block diagram illustrating an exemplary, non-limiting aspect of the PCD of FIG. 2 in the form of a wireless telephone for implementing methods and systems for monitoring conditions indicative of predefined device definitions, adjusting temperature threshold settings based on the device definitions and triggering application of thermal mitigation measures based on the adjusted settings.

FIG. 3 is a functional block diagram that illustrates an exemplary, non-limiting aspect of the PCD 100 of FIG. 2 in the form of a wireless telephone. Embodiments implement the methods and systems for monitoring conditions indicative of predefined device definitions, adjusting temperature threshold settings based on the device definitions and triggering application of thermal mitigation measures based on the adjusted settings. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the TPM module(s) 101 may be responsible for monitoring temperature levels and applying thermal policies that may help a PCD 100 manage thermal conditions and/or thermal loads and avoid experiencing adverse thermal conditions, such as, for example, reaching critical temperatures, while maintaining a high level of functionality.

FIG. 3 also shows that the PCD 100 may include a monitor module 114. The monitor module 114 communicates with multiple operational sensors (e.g., thermal sensors 157 and proximity sensor 24) and components distributed throughout the on-chip system 102 and with the CPU 110 of the PCD 100 as well as with the DD module 26 and TPM module 101. As described above, in some embodiments the monitor module 114 may monitor signals generated by proximity sensor 24 and transmit the signal, or data representative of the signal, to the DD module 26. Similarly, and also as described above, in some embodiments the monitor module 114 may monitor signals that indicate certain components or functionality are active in the PCD 100 and transmit a signal, or data representative of the signal, to the DD module 26. The DD module may adjust temperature thresholds or limits based on the active use case of the PCD 100 and the TPM module 101 may then work with the monitor module 114 to identify adverse thermal conditions relative to temperature thresholds set by DD module 26. The TPM module 101 may then apply one or more thermal mitigation techniques to manage thermal aggressors within chip 102 relative to the adjusted temperature thresholds.

As illustrated in FIG. 3, a display controller 128 and a touch screen controller 130 are coupled to the digital signal processor 110. A touch screen display 132 external to the on-chip system 102 is coupled to the display controller 128 and the touch screen controller 130.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module ("SIM") card 146 may also be coupled to the CPU 110. Further, as shown in FIG. 3, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 3, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 3 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 3 further indicates that a radio frequency ("RF") transceiver 168 may be coupled to the analog signal processor 126. An RF switch 170 may be coupled to the RF transceiver 168 and an RF antenna 172. As shown in FIG. 3, a keypad 174 may be coupled to the analog signal processor 126. Also, a mono headset with a microphone 176 may be coupled to the analog signal processor 126. Further, a vibrator device 178 may be coupled to the analog signal processor 126. FIG. 3 also shows that a power supply 188, for example a battery, is coupled to the on-chip system 102 via a power management integrated circuit ("PMIC") 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103 (See FIG. 4A). However, other types of thermal sensors 157 may be employed without departing from the scope of the invention.

The thermal sensors 157, in addition to being controlled and monitored by an ADC controller 103, may also be controlled and monitored by one or more TPM module(s) 101. The TPM module(s) 101 may comprise software which is executed by the CPU 110. However, the TPM module(s) 101 may also be formed from hardware and/or firmware without departing from the scope of the invention. The TPM module(s) 101 may be responsible for monitoring and applying thermal policies that may be triggered by any combination of signals generated by the sensors 157. For instance, TPM module(s) 101, in some embodiments, may compare operating temperatures measured by sensors 157A with a temperature threshold associated with a device definition identified by DD module 26. The TPM module(s) 101 may subsequently work with the DVFS module 23 to apply a thermal management policy based on the comparison. In other embodiments, the TPM module(s) 101 may compare a "touch temperature" measurement taken by a sensor 157B and with a temperature threshold associated with a device definition identified by DD module 26 and apply a thermal management policy based on the comparison that serves to mitigate thermal energy generation. Notably, the application of thermal management and/or mitigation policies by the TPM module(s) 101 may help a PCD 100 avoid critical temperatures while maintaining a high level of functionality for the active use case.

Similarly, the DD module(s) 26 may comprise software which is executed by the CPU 110. However, the DD module(s) 26 may also be formed from hardware and/or firmware without departing from the scope of the invention.

Returning to FIG. 3, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, proximity sensor 24, docking station 182, PMIC 180 and the power supply 188 are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100. Further, it will be understood that one or more of these devices depicted as external to the on-chip system 102 in the exemplary embodiment of a PCD 100 in FIG. 3 may reside on chip 102 in other exemplary embodiments.

The docking station 182 is depicted as being off-chip, however, it will be understood by one of ordinary skill in the art that a docking station 182 may be in communication with the chip 102 only when the PCD 100 is physically received by the docking station 182. Further, as one of ordinary skill in the art will recognize, a docking station 182 may be configured to received a PCD 100 such that one or more external devices such as, but not limited to, a keyboard, monitor, mouse, printer, etc. may be leveraged by the PCD 100 for the benefit of its user.

In a particular aspect, one or more of the method steps described herein may be implemented by executable instructions and parameters stored in the memory 112 that form the one or more TPM module(s) 101 and DD module(s) 26. These instructions that form the TPM module(s) 101 and DD module(s) 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 4A:
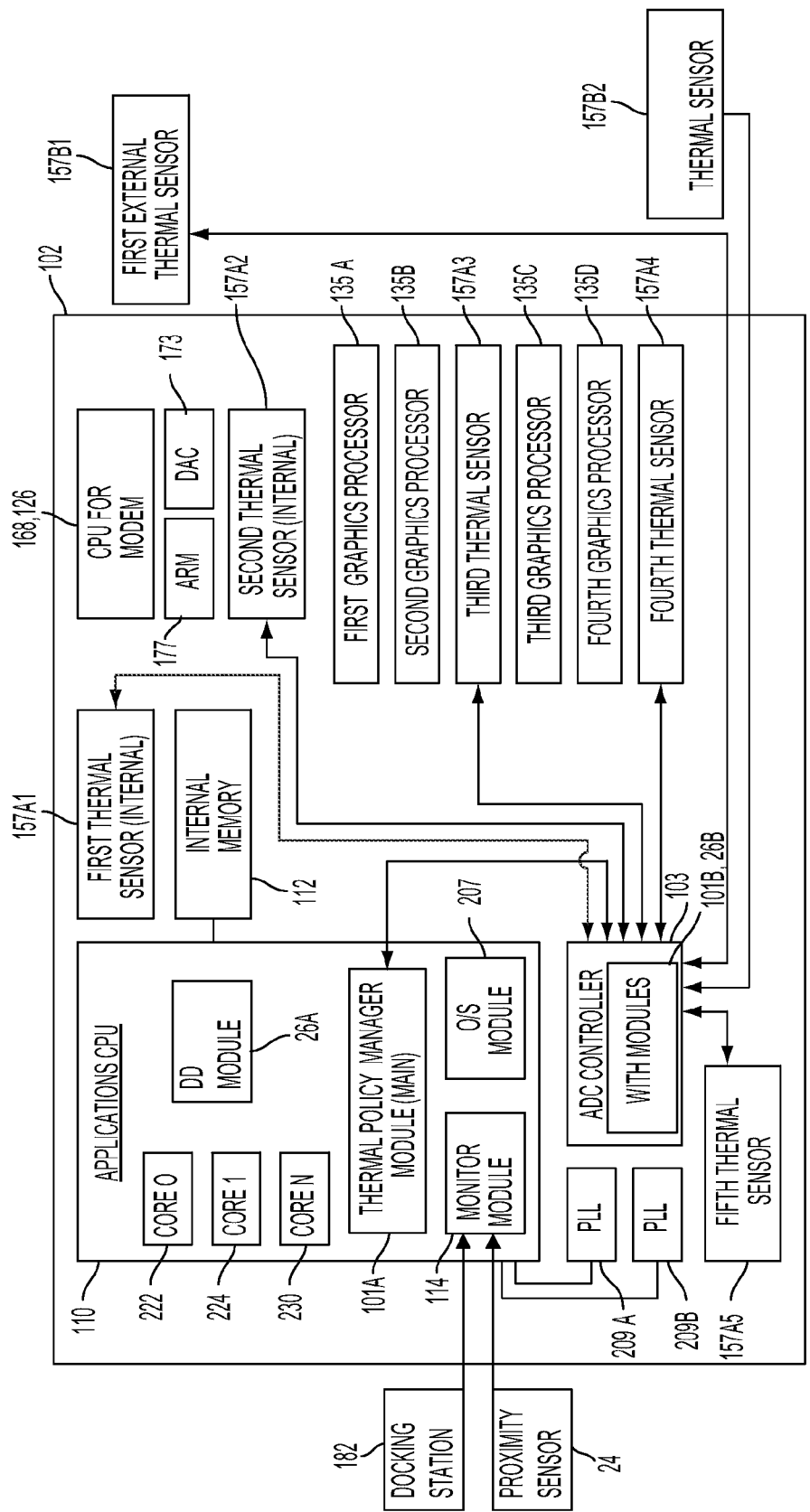
FIG. 4A is a functional block diagram illustrating an exemplary spatial arrangement of hardware for the chip illustrated in FIG. 3.

FIG. 4A is a functional block diagram illustrating an exemplary spatial arrangement of hardware for the chip 102 illustrated in FIG. 3. According to this exemplary embodiment, the applications CPU 110 is positioned on the far left side region of the chip 102 while the modem CPU 168, 126 is positioned on a far right side region of the chip 102. The applications CPU 110 may comprise a multi-core processor that includes a zeroth core 222, a first core 224, and an Nth core 230. The applications CPU 110 may be executing a TPM module 101A and/or DD module 26A (when embodied in software) or it may include a TPM module 101A and/or DD module 26A (when embodied in hardware). The application CPU 110 is further illustrated to include operating system ("O/S") module 207 and a monitor module 114. Further details about the monitor module 114 will be described below in connection with FIG. 4B.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager 101B and/or DD module 26B that works in conjunction with the main modules 101A, 26A of the applications CPU 110.

The thermal policy manager 101B of the ADC controller 103 may be responsible for monitoring and tracking multiple thermal sensors 157 that may be provided "on-chip" 102 and "off-chip" 102. The on-chip or internal thermal sensors 157A may be positioned at various locations and associated with thermal aggressor(s) proximal to the locations.

As a non-limiting example, a first internal thermal sensor 157A1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168, 126, the ARM 177, and DAC 173. A second external thermal sensor 157B2 may be positioned off-chip and adjacent to a lower right quadrant of the chip 102 that may include the third and fourth graphics processors 135C, 135D. Notably, one or more of external thermal sensors 157B may be leveraged to indicate the touch temperature of the PCD 100, i.e. the temperature that may be experienced by a user in contact with the PCD 100.

One of ordinary skill in the art will recognize that various other spatial arrangements of the hardware illustrated in FIG. 4A may be provided without departing from the scope of the invention. FIG. 4A illustrates yet one exemplary spatial arrangement and how the main TPM and DD modules 101A, 26A and ADC controller 103 with its TPM and DD modules 101B, 26B may recognize thermal conditions that are a function of the exemplary spatial arrangement illustrated in FIG. 4A, compare temperature thresholds dictated by device definitions with operating temperatures and/or touch temperatures and apply thermal management policies.

Figure 4B:
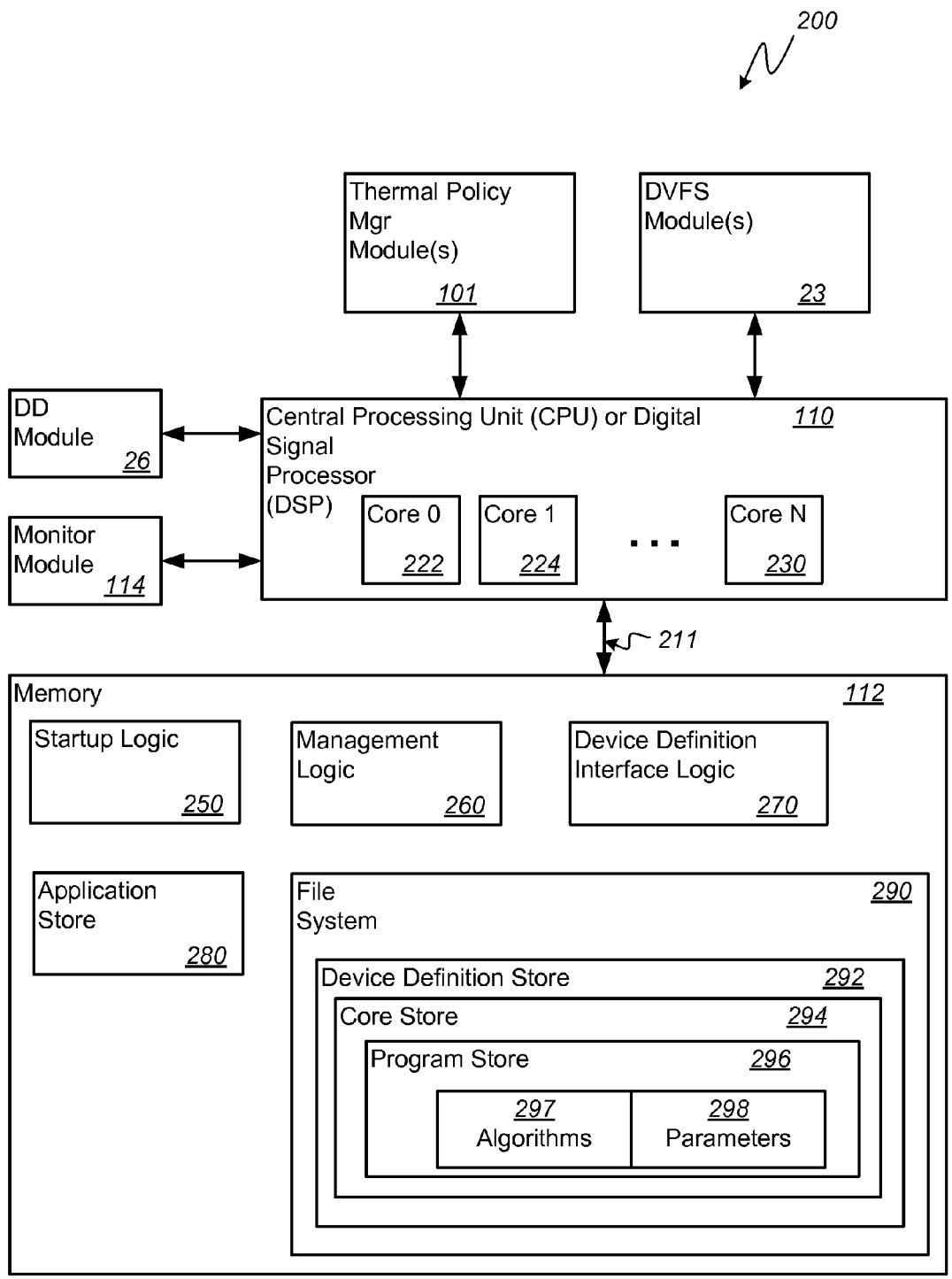
FIG. 4B is a schematic diagram illustrating an exemplary software architecture of the PCD of FIG. 3 for device definition-driven thermal management.

FIG. 4B is a schematic diagram illustrating an exemplary software architecture of the PCD 100 of FIG. 3 for device definition-driven thermal management. Any number of algorithms 297 may form or be part of at least one thermal management policy that may be applied by the thermal policy manager 101 when certain thermal conditions are met.

As illustrated in FIG. 4B, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the DD module(s) 26 and/or TPM module(s) 101 that may comprise software and/or hardware. If embodied as software, the module(s) 101, 26 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 4B, it should be noted that one or more of startup logic 250, management logic 260, device definition interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the device definition interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled multiple processor cores.

The startup logic 250 includes one or more executable instructions for selectively identifying, loading, and executing a select program for managing or controlling the performance of one or more of the available cores such as the first core 222, the second core 224 through to the $N^{th}$ core 230 per temperature thresholds associated with various device definitions. The startup logic 250 may identify, load and execute a select program based on the comparison, by the TPM module 101, of various temperature measurements with threshold temperature settings associated with a device definition. An exemplary select program can be found in the program store 296 of the embedded file system 290 and is defined by a specific combination of a performance scaling algorithm 297 and a set of parameters 298. The exemplary select program, when executed by one or more of the core processors in the CPU 110 may operate in accordance with one or more signals provided by the monitor module 114 in combination with control signals provided by the one or more TPM module(s) 101 to scale the performance of the respective processor core "up" or "down." In this regard, the monitor module 114 may provide one or more indicators of events, processes, applications, resource status conditions, elapsed time, as well as temperature as received from the TPM module 101.

The management logic 260 includes one or more executable instructions for terminating a thermal management program on one or more of the respective processor cores, as well as selectively identifying, loading, and executing a more suitable replacement program for managing or controlling the performance of one or more of the available cores. The management logic 260 is arranged to perform these functions at run time or while the PCD 100 is powered and in use by an operator of the device. A replacement program can be found in the program store 296 of the embedded file system 290 and, in some embodiments, may be defined by a specific combination of a performance scaling algorithm 297 and a set of parameters 298.

The replacement program, when executed by one or more of the core processors in the digital signal processor may operate in accordance with one or more signals provided by the monitor module 114 or one or more signals provided on the respective control inputs of the various processor cores by the DVFS module 23 to scale the performance of the respective processor core. In this regard, the monitor module 114 may provide one or more indicators of events, processes, applications, resource status conditions, elapsed time, temperature, etc in response to control signals originating from the TPM 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when a certain device definition is recognized by the DD module 26. By way of further example, the inputs may include a change to the management logic 260 that instructs the PCD 100 to apply a desired program when the video codec 134 is active per a different device definition.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged device definition store 292. In this regard, the file system 290 may include a reserved section of its total file system capacity for the storage of information for the configuration and management of the various parameters 298 and thermal management algorithms 297 used by the PCD 100. As shown in FIG. 4B, the device definition store 292 includes a core store 294, which includes a program store 296, which includes one or more thermal management programs.

Figure 5:
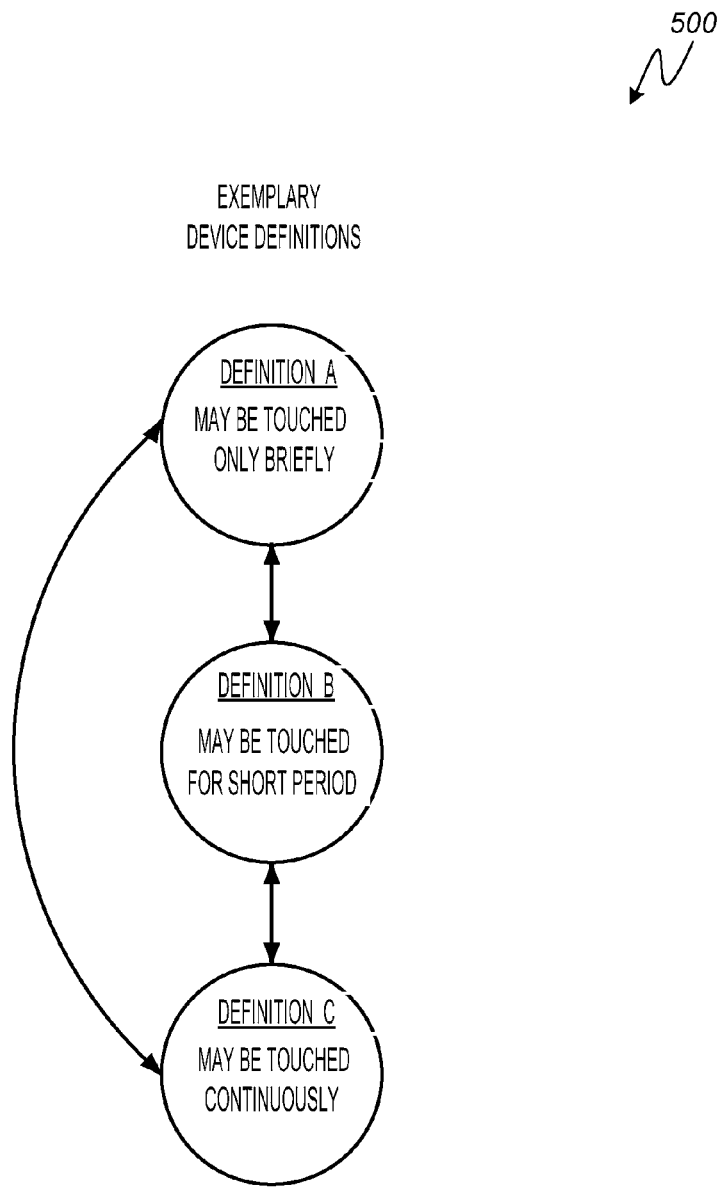
FIG. 5 is an exemplary state diagram that illustrates various device definitions that may trigger adjustment of temperature thresholds by the device definition module in the PCD of FIG. 2.

FIG. 5 is an exemplary state diagram 500 that illustrates various device definitions that may trigger adjustment of temperature thresholds by the device definition module 26 in the PCD 100 of FIG. 2. Beginning with device Definition C, the definition may comprise a "may be touched continuously" standard in which the DD module 26 recognizes from one or more inputs, such as a signal from the proximity sensor 24, that the PCD 100 is being used in a manner that may require the PCD 100 to be in constant physical contact with the user. Notably, when defined per Definition C, the touch temperature of the PCD 100, as may be indicated by an off-chip sensor 157B, is leveraged by the thermal policy manager 101 to determine thermal management policies suitably for maintaining the touch temperature below a predefined temperature threshold acceptable for continuous user contact. The TPM 101 may monitor any, or a combination of, thermal sensors 157 to measure or derive the touch temperature of PCD 100 prior to applying, maintaining or terminating a thermal management policy.

In this exemplary Definition C, the PCD 100 is usually not in any danger or risk of reaching critical temperatures that may cause failure of any of the hardware and/or software components because the touch temperature is commonly significantly less than the operating temperature limits of the components within PCD 100. In this exemplary device definition, the thermal sensors 157 may be detecting or tracking temperatures that indicate a touch temperature at or below about 20° C. above ambient. However, one of ordinary skill in the art will recognize that other temperature ranges may be established for a device definition associated with continuous user contact without departing from the scope of the invention.

The middle device definition, Definition B, may comprise a "may be touched for short period" standard in which the DD module 26 recognizes from one or more monitored inputs that the PCD 100 is being used in a manner that does not place it proximal to a user. Notably, per exemplary device Definition B, temperatures associated with one or more processing components of the PCD 100, as may be indicated by an on-chip sensor 157A or correlated with a measurement by an off-chip sensor 157B, is leveraged by the thermal policy manager 101 to determine thermal management policies suitable for optimizing processing performance without exceeding operating temperature thresholds of the various processing components. Advantageously, per the temperature thresholds associated with Definition B, the touch temperature of the PCD 100 may be allowed to exceed the temperature threshold described above relative Definition C, as the PCD 100 is not in immediate proximity to a user and may only come into physical contact with the user for a short period of time. As such, the TPM module 101 may implement thermal management policies that allow the various processing components to increase performance, thereby increasing QoS, and still stay below a skin temperature threshold that was increased relative to that of Definition C.

It is envisioned that, in some embodiments, a Definition B may include a temperature threshold that exceeds the touch temperature threshold described above relative to Definition C but is less than the maximum operating temperature of the various processing components. In this way, subject to the temperature threshold set by the DD module 26 when the PCD 100 is defined per Definition C, the TPM module 101 may apply thermal management policies that provide for increased processing performance without dissipating thermal energy at a rate that may cause the touch temperature to become unbearable should the PCD 100 be redefined to Definition C when a user "picks it up." That is, per Definition B, the touch temperature threshold may be adjusted by the DD module 26 to allow for increased processing performance without causing the PCD 100 to become so hot that thermal energy can't be quickly dissipated upon redefining the device definition to Definition C.

As will be understood by one of ordinary skill in the art, this exemplary device Definition B may be recognized by the DD module 26 when a change of use case has been detected relative to Definitions A or C. In the second device definition, Definition B, the TPM module 101 may request or it may actually perform one or more thermal management techniques in order to increase the processing performance, and consequently the temperature as well, of the PCD 100. Per this exemplary device Definition B, the thermal policy manager 101 is designed to implement or request thermal mitigation techniques that may significantly increase the quality of service provided by the PCD 100 to a user, at the expense of increasing the touch temperature of the PCD 100. The temperature range for the operating temperature of one or more processing components when the PCD 100 is defined per Definition B may comprise a range between about 25° C. above ambient to about 40° C. above ambient. One of ordinary skill in the art will recognize, however, that other temperature ranges may be established and are within the scope of the invention.

Device Definition A may comprise a "may be touched only briefly" standard in which the DD module 26 recognizes that the PCD 100 is being used in a manner that does not require significant physical contact with the user. For example, the DD module 26 may define the PCD 100 per Definition A when it recognizes that the PCD 100 has been received by a docking station 182 or other hardware device configured to allow the PCD 100 to communicate with one or more external devices such as, but not limited to, a keyboard, a monitor, a mouse, a printer, etc. In some embodiments, a docking station or other peripheral device may include mechanical interface aspects that contribute to the efficiency of thermal energy dissipation from the PCD 100.

Notably, when a PCD 100 is docked the DD module 26 may recognize that the PCD 100 is not only physically separated from a user but also received by the docking station and unlikely to be physically contacted by a user. As such, when the PCD 100 is recognized as being in the docked state, the DD module 26 may set temperature thresholds in accordance with Definition A such that the TPM module 101 may apply thermal management policies that allow the processing components 110 and/or other components of the PCD 100 to run at high rates of power consumption.

Advantageously, because the PCD 100 is in communication with a docking station 182, the DD module 26 may recognize that performance efficiency is a more significant factor for user experience than touch temperature and, accordingly, set temperature thresholds that trigger the TPM module 101 to implement thermal management policies geared for optimizing PCD performance at the expense of thermal energy generation.

Another use case that is envisioned to fall within a device definition such as Definition A includes benchmark testing. As one of ordinary skill in the art would acknowledge, benchmark testing of a PCD requires the performance of the PCD to be maximized without regard for one or more temperature limits, including the skin temperature limit. As such, it is envisioned that some embodiments may monitor data associated with OS level instructions to identify a benchmark testing use case and then define the PCD accordingly so that temperature thresholds that could inhibit the PCD from running at a maximum performance level are relaxed or ignored.

The temperature range for threshold temperatures of various components when the PCD 100 is defined per Definition A may comprise a range limited only by a maximum temperature specified for a brief touch (e.g., 95° C. for plastic surfaces per UL 60950), although other limits are envisioned to be within the scope of the disclosure.

As one of ordinary skill in the art will recognize, any of the various device definitions may be initiated based upon a change in the use case of the PCD 100, as detected by the monitor module 114 and recognized by the DD module 26. For example, as the arrows in this diagram illustrate, each device definition may be initiated in sequence or they can be initiated out of sequence depending upon the change in active functionality or use case.

FIG. 6 is a diagram illustrating exemplary conditions and thermal management policies associated with the device definitions illustrated in FIG. 5. As noted previously, the first device Definition A may comprise a "may be touched only briefly" standard in which the thermal policy manager 101 being executed by the CPU 110 and partially by the ADC controller 103 may monitor, poll, or receive one or more status reports on temperature from one or more thermal sensors 157, compare the status reports to a threshold temperature associated with temperature operating limits of one or more components within the PCD 100, and apply appropriate thermal management policies to optimize performance without detrimentally effecting the PCD 100. Per device Definition A, the DD module 26 may have received a signal from the proximity sensor 24 or other use case indicator indicating that the PCD 100 is not proximal to a user and/or confirmation that the PCD 100 has been received by an external docking device, for example. Because the PCD 100 is not near the user and has been received into a docking device for the full leveraging of its performance capabilities, the touch temperature threshold may not be a significant driver of user experience. Rather, when being used in a manner that falls under device Definition A, the primary driver of user experience may be the QoS subject only to operating temperatures that could damage the PCD 100. As such, the TPM 101 may implement thermal management techniques that substantially increase component performance at the expense of thermal energy generation.

The second device Definition B may comprise a "may be touched for short period" standard in which the thermal policy manager 101 being executed by the CPU 110 and partially by the ADC controller 103 may monitor, poll, or receive one or more status reports on temperature from one or more thermal sensors 157, compare the status reports to a threshold temperature associated with an increased touch temperature of the device and apply appropriate thermal management policies to optimize performance without exceeding the adjusted touch temperature threshold. Per this device Definition B, the DD module 26 may have received, for example, a signal from the proximity sensor 24 indicating that the PCD 100 is not proximal to a user. Because the PCD 100 is not near the user, the touch temperature threshold may be increased such that the primary determinant of user experience is the QoS subject to a modest increase in touch temperature. As such, the TPM 101 may implement thermal management techniques that increase the performance level of one or more components at the expense of increased thermal energy generation. Notably, in some embodiments, the increased touch temperature may be determined based on a level that allows for increased performance without generating so much thermal energy that the PCD 100 cannot dissipate energy at a reasonable rate for redefinition to Definition A.

The third device Definition C may comprise a "may be touched continuously" standard in which the thermal policy manager 101 being executed by the CPU 110 and partially by the ADC controller 103 may monitor, poll, or receive one or more status reports on temperature from one or more thermal sensors 157, compare the status reports to a threshold temperature associated with an acceptable touch temperature of the device, and apply appropriate thermal management policies to maintain the touch temperature below the threshold. Per the temperature limits associated with device Definition C, the DD module 26 may have received a signal from the proximity sensor 24 indicating that the PCD 100 is proximal to a user or, in a different use case also associated with Definition C, the DD module 26 may have received indication that the RF transceiver 168 is active per a telecommunication. Because the PCD 100 is near the user per Definition C, the touch temperature threshold may be a primary determinant of user experience and, as such, the TPM 101 may implement thermal mitigation techniques that sacrifice QoS in favor of mitigating thermal energy generation.

Figure 7:
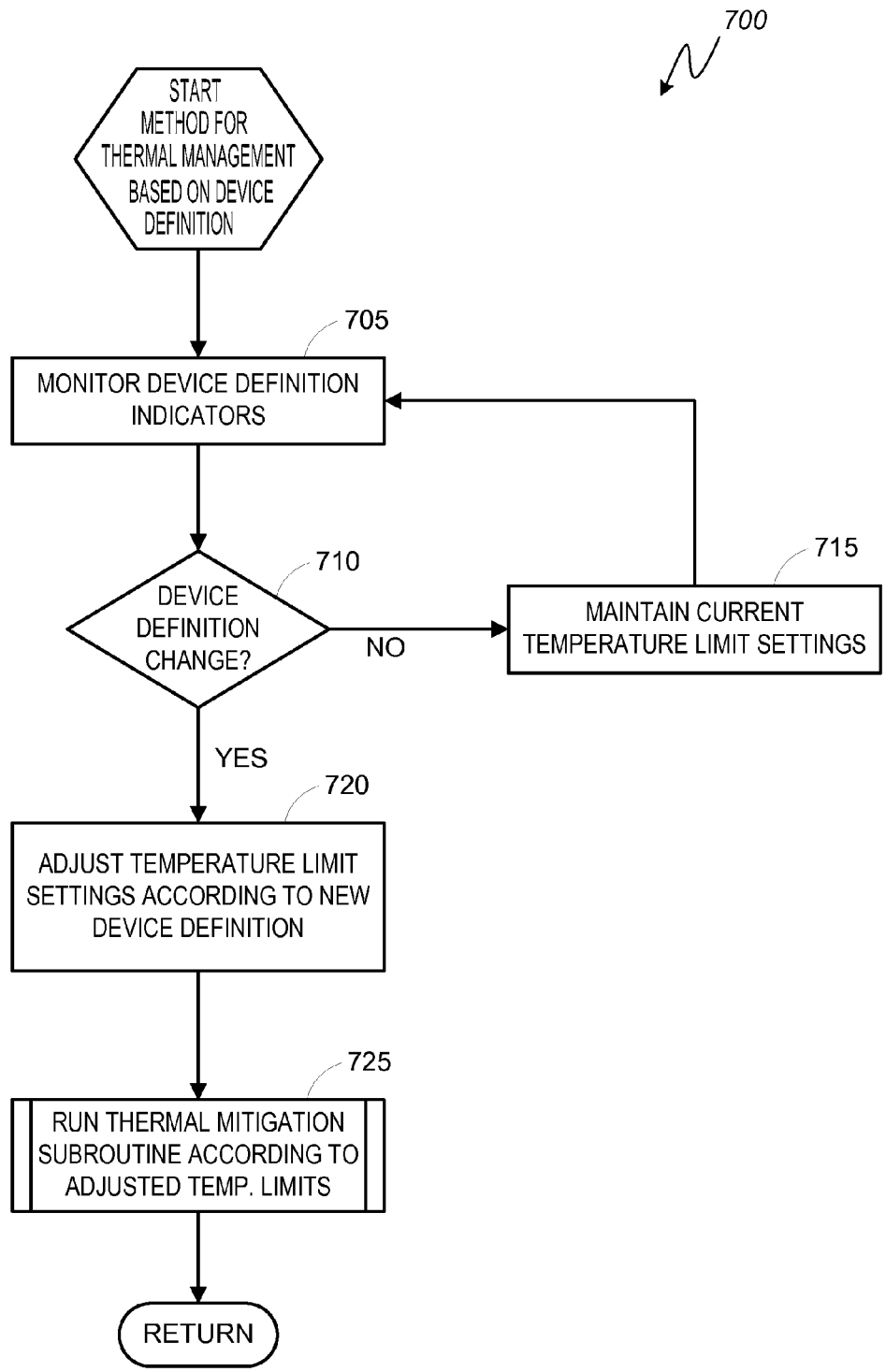
FIG. 7 is a logical flowchart illustrating a method for managing one or more thermal policies based on device definitions.

FIG. 7 is a logical flowchart 700 that illustrates a method for managing one or more thermal policies based on device definitions. Method 700 of FIG. 7 starts with a first block 705 where the monitor module 114 monitors one or more indicators of active functionality that can be mapped to a device definition. As described above, the monitor module 114 may monitor a proximity sensor, an accessory device connection, the RF transceiver, or any component or condition that may be useful to indicate that the PCD 100 is being used in a certain manner. Based on the indicators, the monitor module 114 may work with the DD module 26 to select a device definition. As described above, temperature thresholds against which a TPM module 101 dictates thermal management policies (and, by extension, performance levels) may vary according to how the PCD 100 is being used and, therefore, vary by device definition.

Concerning the application of thermal management techniques by the TPM module 101, one of ordinary skill in the art will recognize that systems and methods for triggering thermal management policies based on temperature measurements are not limited by the particular thermal management techniques that may or may not be triggered. Even so, thermal mitigation techniques that may be initiated by one or more embodiments include, but not limited to, (1) load scaling and/or (2) load dynamic scaling; (3) spatial load shifting; and (4) process load reallocation. Generally, thermal management techniques that include load scaling may comprise adjusting or "scaling" the maximum clock frequency allowed in DVFS algorithm. Advantageously, such an adjustment may limit the maximum heat dissipation. Thermal management techniques that include spatial load shifting and/or load reallocation include algorithms for distributing workloads within a given processing core or across multiple processing cores. In this way, thermal energy generation and dissipation may be managed by distributing the workload across a larger processing area, processing the workload in processing capacity associated with higher or lower power densities relative to initial allocation, or leveraging underutilized processing components to perform as heat sinks.

Returning to the method 700, at decision block 710, the DD module 26 may determine whether the PCD 100 is being used in a manner that dictates a change in device definition. If there is no change in the monitored indicators that warrant a redefined device definition, then the "no" branch is followed to block 715 and the current temperature threshold settings are maintained. If at decision block 710 it is determined by the DD module 26 that the PCD 100 is being used in a manner that warrants a change in device definition then the "yes" branch is followed to block 720. An example of a change in use or indicators that may cause the DD module 26 to determine that a device definition change is in order may be that the monitor module 114 recognizes an indication that the PCD 100 is no longer being used for a telecommunication and has been docked in a docking station and a navigation application is running.

At block 720, the DD module 26 redefines the device definition and queries the temperature threshold LUT 25 to identify temperature thresholds associated with the redefined device definition. The temperature thresholds are adjusted accordingly and the method 700 moves to block 725. At block 725 the TPM module 101 works with the DVFS module to regulate power consumption such that performance is optimized subject to the new temperature limits.

FIG. 8 is a logical flowchart illustrating a sub-method or subroutine 725 for applying device definition-driven thermal management policies. The method 725 of FIG. 8 starts with decision block 805. At decision block 805, the TPM module 101 may determine whether the DD module 26 has changed the device definition and consequently the threshold temperatures for triggering thermal management policies. Notably, the DD module 26 may not only change or set a threshold temperature, but may also change or determine an aspect within the PCD 100 that is associated with the threshold temperature. For instance, as has been suggested above, the threshold temperature determined by the DD module 26, and used by the TPM module 101 to trigger thermal management policy, may be associated with any number of aspects within the PCD 100 including, but not limited to, a processing component (i.e., operating temperature of the component), the external temperature of the PCD 100 (i.e., the touch temperature of the device) or a cascaded logic that includes a first threshold temperature measured by a first sensor subject to a second threshold temperature measured by a second sensor.

If the TPM module 101 determines at decision block 805 that the threshold temperature has not been changed by the DD module 26, i.e. that the device definition has not been modified, then the presently implemented thermal management policies may be maintained by the TPM module 101. If, however, at decision block 805 the TPM module 101 recognizes a change in the temperature threshold and/or the sensor that is monitored for the temperature threshold, the "yes" branch is followed to block 815. At block 815, the TPM module 101 may compare the newly set temperature threshold to the actual temperature measured at an associated sensor such as, for example, sensors 157A or 157B. Based on the comparison, the TPM module 101 may review the currently implemented thermal management policies, if any, at block 820 and decide at decision block 825 whether the currently implement thermal management policies require adjustment. If at decision block 825 the TPM module 101 determines that no adjustment or modification of thermal management policies is warranted in light of the block 815 comparison, the "no" branch is followed back to block 810 and the current policies are maintained. If, however, at decision block 825 the TPM module 101 determines that a change or modification of thermal management policies is warranted, the "yes" branch is followed to block 830 and the TPM module 101 may elect to implement one or more alternative thermal management techniques.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for controlling processing performance in a portable computing device ("PCD"), the method comprising:
    establishing a first device definition for the PCD, wherein a device definition comprises a use case for the PCD and is associated with one or more temperature thresholds;
    monitoring a plurality of indicators in the PCD, wherein the plurality of indicators includes a signal indicating a proximity of a user of the PCD and one or more signals indicating how the PCD is being used;
    identifying a second use case of the PCD based on the plurality of monitored indicators in the PCD, wherein the second use case of the PCD is defined by an amount of physical contact a user of the PCD will have with the PCD and how the PCD is being used;

identifying a second device definition associated with the identified second use case;

determining that the second device definition is different from the first device definition; and redefining the first device definition of the PCD to the second device definition, wherein redefining to the second device definition comprises modifying a skin temperature threshold to a second level and adjusting one or more additional temperature thresholds to adjust performance constraints on the processing components within the PCD to a desired processing performance of the PCD for the identified second use case.

2. The method of claim 1, further comprising modifying a thermal mitigation technique based on the one or more modified temperature thresholds.

3. The method of claim 2, wherein the thermal mitigation technique comprises a dynamic voltage and frequency scaling ("DVFS") algorithm.

4. The method of claim 1, further comprising:

identifying a third use case of the PCD based on the plurality of monitored indicators in the PCD, wherein the third use case of the PCD is defined by an amount of physical contact a user of the PCD will have with the PCD and how the PCD is being used;

identifying a third device definition associated with the third use case;

determining that the third device definition is different from the second device definition; and redefining the device definition of the PCD to the third device definition, wherein redefining to the third device definition comprises modifying a skin temperature threshold to a third level and adjusting one or more additional temperature thresholds to adjust performance constraints on the processing components within the PCD to a desired processing performance of the PCD for the identified third use case.

5. The method of claim 1, wherein the plurality of indicators further comprises a signal that the PCD is in communication with an accessory device external to the PCD.

6. The method of claim 1, wherein the plurality of indicators further comprises operating system level data indicative of a benchmark test.

7. The method of claim 6, wherein modifying a skin temperature threshold to a second level comprises ignoring the touch temperature threshold.

8. The method of claim 1, wherein the touch temperature threshold is based on the external surface temperature of the PCD.

9. The method of claim 1, wherein the PCD is in the form of a wireless telephone.

10. A computer system for controlling processing performance in a portable computing device ("PCD"), the system comprising:

a device definition ("DD") module, configured to:

establish a first device definition for the PCD, wherein a device definition comprises a use case for the PCD and is associated with one or more temperature thresholds;

monitor a plurality of indicators in the PCD, wherein the plurality of indicators includes a signal indicating a proximity of a user of the PCD and one or more signals indicating how the PCD is being used;

identify a second use case of the PCD based on the plurality of monitored indicators in the PCD, wherein the second use case of the PCD is defined by an amount of physical contact a user of the PCD will have with the PCD and how the PCD is being used;

identify a second device definition associated with the identified use case;

determine that the second device definition is different from the first device definition; and redefine the first device definition of the PCD to the second device definition, wherein redefining to the second device definition comprises modifying a skin temperature threshold to a second level and adjusting one or more additional temperature thresholds to adjust performance constraints on the processing components within the PCD to a desired processing performance of the PCD for the identified second use case.

11. The computer system of claim 10, further comprising a thermal policy manager ("TPM") configured to modify a thermal mitigation technique based on the one or more modified temperature thresholds.

12. The computer system of claim 11, wherein the thermal mitigation technique comprises a dynamic voltage and frequency scaling ("DVFS") algorithm.

13. The computer system of claim 10, wherein the DD module is further configured to:

identify third use case of the PCD based on the plurality of monitored indicators in the PCD, wherein the third use case of the PCD is defined by an amount of physical contact a user of the PCD will have with the PCD and how the PCD is being used;

identify a third device definition associated with the third use case;

determine that the third device definition is different from the second device definition; and redefine the device definition of the PCD to the third device definition, wherein redefining to the third device definition comprises modifying a skin temperature threshold to a third level and adjusting one or more additional temperature thresholds to adjust performance constraints on the processing components within the PCD to a desired processing performance of the PCD for the identified third use case.

14. The computer system of claim 10, wherein the plurality of indicators further comprises a signal that the PCD is in communication with an accessory device external to the PCD.

15. The computer system of claim 10, wherein the plurality of indicators further comprises operating system level data indicative of a benchmark test.

16. The computer system of claim 15, wherein modifying a skin temperature threshold to a second level comprises ignoring the touch temperature threshold.

17. The computer system of claim 10, wherein the touch temperature threshold is based on the external surface temperature of the PCD.

18. The computer system of claim 10, wherein the PCD is in the form of a wireless telephone.

19. A computer system for controlling processing performance in a portable computing device ("PCD"), the system comprising:

means for establishing a first device definition for the PCD, wherein a device definition comprises a use case for the PCD and is associated with one or more temperature thresholds;

means for monitoring a plurality of indicators in the PCD, wherein the plurality of indicators includes a signal indicating a proximity of a user of the PCD and one or more signals indicating how the PCD is being used;

identifying a second use case of the PCD based on the plurality of monitored indicators in the PCD, wherein the second use case of the PCD is defined by an amount of physical contact a user of the PCD will have with the PCD and how the PCD is being used;

means for identifying a second device definition associated with the identified second use case;

means for determining that the second device definition is different from the first device definition; and means for redefining the first device definition of the PCD to the second device definition, wherein redefining to the second device definition comprises modifying a skin temperature threshold to a second level and adjusting one or more additional temperature thresholds to adjust performance constraints on the processing components within the PCD to a desired processing performance of the PCD for the identified second use case.

20. The computer system of claim 19, further comprising means for modifying a thermal mitigation technique based on the one or more modified temperature thresholds.

21. The computer system of claim 20, wherein the thermal mitigation technique comprises a dynamic voltage and frequency scaling ("DVFS") algorithm.

22. The computer system of claim 19, further comprising:
means of identifying a third use case of the PCD based on the plurality of monitored indicators in the PCD, wherein the third use case of the PCD is defined by an amount of physical contact a user of the PCD will have with the PCD and how the PCD is being used;

means for identifying a third device definition associated with the third use case;

means for determining that the third device definition is different from the second device definition; and means for redefining the device definition of the PCD to the third device definition, wherein redefining to the third device definition comprises modifying a skin temperature threshold to a third level and adjusting one or more additional temperature thresholds to adjust performance constraints on the processing components within the PCD to a desired processing performance of the PCD for the identified third use case.

23. The computer system of claim 19, wherein the plurality of indicators further comprises a signal that the PCD is in communication with an accessory device external to the PCD.

24. The computer system of claim 19, wherein the plurality of indicators further comprises operating system level data indicative of a benchmark test.

25. The computer system of claim 24, wherein modifying a skin temperature threshold to a second level comprises ignoring the touch temperature threshold.

26. The computer system of claim 19, wherein the touch temperature threshold is based on the external surface temperature of the PCD.

27. The computer system of claim 19, wherein the PCD is in the form of a wireless telephone.

28. A computer program product comprising a computer usable device having a non-transitory computer readable program code embodied therein, said non-transitory computer readable program code adapted to be executed to implement a method for controlling processing performance in a portable computing device ("PCD"), said method comprising:

establishing a first device definition for the PCD, wherein a device definition comprises a use case for the PCD and is associated with one or more temperature thresholds;

monitoring a plurality of indicators in the PCD, wherein the plurality of indicators includes a signal indicating a proximity of a user of the PCD and one or more signals indicating how the PCD is being used;

identifying a second use case of the PCD based on the plurality of monitored indicators in the PCD, wherein the second use case of the PCD is defined by an amount of physical contact a user of the PCD will have with the PCD and how the PCD is being used;

identifying a second device definition associated with the identified second use case;

determining that the second device definition is different from the first device definition; and redefining the first device definition of the PCD to the second device definition, wherein redefining to the second device definition comprises modifying a skin temperature threshold to a second level and adjusting one or more additional temperature thresholds to adjust performance constraints on the processing components within the PCD to a desired processing performance of the PCD for the identified second use case.

29. The computer program product of claim 28, further comprising modifying a thermal mitigation technique based on the one or more modified temperature thresholds.

30. The computer program product of claim 29, wherein the thermal mitigation technique comprises a dynamic voltage and frequency scaling ("DVFS") algorithm.

31. The computer program product of claim 28 further comprising:
identifying a third use case of the PCD based on the plurality of monitored indicators in the PCD, wherein the third use case of the PCD is defined by an amount of physical contact a user of the PCD will have with the PCD and how the PCD is being used;

identifying a third device definition associated with the third use case;

determining that the third device definition is different from the second device definition; and redefining the device definition of the PCD to the third device definition, wherein redefining to the third device definition comprises modifying a skin temperature threshold to a third level and adjusting one or more additional temperature thresholds to adjust performance constraints on the processing components within the PCD to a desired processing performance of the PCD for the identified third use case.

32. The computer program product of claim 28, wherein the plurality of indicators further comprises a signal that the PCD is in communication with an accessory device external to the PCD.

33. The computer program product of claim 28, wherein the plurality of indicators further comprises operating system level data indicative of a benchmark test.

34. The computer program product of claim 33, wherein modifying a skin temperature threshold to a second level comprises ignoring the touch temperature threshold.

35. The computer program product of claim 28, wherein the touch temperature threshold is based on the external surface temperature of the PCD.

36. The computer program product of claim 28, wherein the PCD is in the form of a wireless telephone.

* * * * *